US012537260B2

(12) United States Patent
Latulipe et al.

(10) Patent No.: US 12,537,260 B2
(45) Date of Patent: Jan. 27, 2026

(54) ENERGY STORAGE UNIT WITH ACTIVE VENTILATION SYSTEM AND ASSOCIATED METHOD

(71) Applicant: EVLO ENERGY STORAGE INC., Montréal (CA)

(72) Inventors: Éric Latulipe, Montréal (CA); Martin Burns, Montréal (CA); Philippe Mongeau, Montréal (CA); Jean-François Paul, Montréal (CA)

(73) Assignee: EVLO ENERGY STORAGE INC., Montréal (CA)

( * ) Notice: Subject to any disclaimer, the term of this patent is extended or adjusted under 35 U.S.C. 154(b) by 305 days.

(21) Appl. No.: 17/824,748

(22) Filed: May 25, 2022

(65) Prior Publication Data

US 2023/0170574 A1 Jun. 1, 2023

(30) Foreign Application Priority Data

Nov. 26, 2021 (CA) ..................................... 3140540

(51) Int. Cl.
*H01M 50/317* (2021.01)
*H01M 10/613* (2014.01)
(Continued)

(52) U.S. Cl.
CPC ....... *H01M 50/317* (2021.01); *H01M 10/613* (2015.04); *H01M 10/63* (2015.04);
(Continued)

(58) Field of Classification Search
CPC .. H01M 10/63; H01M 10/425; H01M 10/486; H01M 10/613; H01M 10/625;
(Continued)

(56) References Cited

U.S. PATENT DOCUMENTS

| 2007/0163648 | A1* | 7/2007 | Eijkelenberg | ........... F16K 17/36 137/71 |
| 2012/0237803 | A1* | 9/2012 | Mardall | .............. H01M 10/653 429/53 |

(Continued)

FOREIGN PATENT DOCUMENTS

| AU | 2021231264 A1 | 2/2022 |
| CA | 3034193 A1 | 8/2019 |

(Continued)

OTHER PUBLICATIONS

EP3430657A1, Jourdren, "Container for storing at least one electrical energy storage unit, provided with a vent hatch", machine English translation retrieved from https://worldwide.espacenet.com/ Date: Sep. 19, 2023 (Year: 2019).*

(Continued)

*Primary Examiner* — Matthew T Martin
*Assistant Examiner* — Jared Hansen
(74) *Attorney, Agent, or Firm* — Fitch, Even, Tabin & Flannery LLP (57) ABSTRACT

An energy storage unit capable of controlling a thermal runaway, comprising an enclosure for housing battery modules for energy storage, a movable panel configurable between a closed position and an open position, a controllable actuator, connected to the movable panel, for moving the movable panel from the closed position to the open position, at least one sensor capable of measuring environmental parameters of the interior of the enclosure and a control unit connected to the sensor and the controllable actuator, for automatically activating the actuator and moving the panel from the closed position to the open position when at least one of the measured environmental parameters is indicative of thermal runaway, so that heat and explosive gases generated by the thermal runaway can escape outside the enclosure. A method for controlling a thermal runaway (Continued)

phenomenon of an energy storage unit comprising battery modules is also described.

20 Claims, 11 Drawing Sheets

(51) Int. Cl.
- *H01M 10/63* (2014.01)
- *H01M 10/6563* (2014.01)
- *H01M 10/663* (2014.01)
- *H01M 50/24* (2021.01)
- *H01M 50/375* (2021.01)

(52) U.S. Cl.
CPC ..... *H01M 10/6563* (2015.04); *H01M 10/663* (2015.04); *H01M 50/24* (2021.01); *H01M 50/375* (2021.01)

(58) Field of Classification Search
CPC ............ H01M 10/658; H01M 10/663; H01M 10/6563; H01M 50/204; H01M 50/209; H01M 50/271; H01M 50/317; H01M 50/375; H01M 2200/00; H01M 2200/10; H01M 2220/10; H01M 2220/20; Y02E 60/10
See application file for complete search history.

(56) References Cited

U.S. PATENT DOCUMENTS

| | | | |
|---|---|---|---|
| 2015/0093614 A1* | 4/2015 | Fukuhara | H01M 50/204 429/90 |
| 2022/0401770 A1* | 12/2022 | Sandahl | A62C 37/04 |

FOREIGN PATENT DOCUMENTS

| | | | | |
|---|---|---|---|---|
| CN | 102856596 | A | 1/2013 | |
| CN | 202977567 | U | 6/2013 | |
| CN | 107078364 | A | 8/2017 | |
| CN | 109786868 | A | 5/2019 | |
| CN | 109817853 | A | 5/2019 | |
| CN | 110391367 | A | 10/2019 | |
| CN | 110420417 | A | 11/2019 | |
| CN | 210460079 | U * | 5/2020 | |
| CN | 111613842 | A | 9/2020 | |
| CN | 211751985 | U | 10/2020 | |
| CN | 112043993 | A | 12/2020 | |
| CN | 112310552 | A | 2/2021 | |
| CN | 212480258 | U | 2/2021 | |
| CN | 212593613 | U | 2/2021 | |
| CN | 112447976 | A | 3/2021 | |
| CN | 112789757 | A | 5/2021 | |
| CN | 113381087 | A | 9/2021 | |
| CN | 113422148 | A | 9/2021 | |
| CN | 113521604 | A | 10/2021 | |
| CN | 113594565 | A | 11/2021 | |
| CN | 113725474 | A | 11/2021 | |
| CN | 113764813 | A | 12/2021 | |
| CN | 215184311 | U | 12/2021 | |
| CN | 215427059 | U | 1/2022 | |
| CN | 215585309 | U | 1/2022 | |
| CN | 114053632 | A | 2/2022 | |
| CN | 215896515 | U | 2/2022 | |
| CN | 216015481 | U | 3/2022 | |
| CN | 216054964 | U | 3/2022 | |
| CN | 114284614 | A | 4/2022 | |
| CN | 114402478 | A | 4/2022 | |
| DE | 102013012250 | A1 | 1/2015 | |
| EP | 3430657 | A1 * | 1/2019 | ............ H01M 10/48 |
| EP | 3792998 | A1 | 3/2021 | |
| EP | 3989332 | A1 | 4/2022 | |
| GB | 2599697 | A | 4/2022 | |
| JP | 2020004716 | A | 1/2020 | |
| KR | 200474982 | Y1 * | 10/2014 | |
| KR | 101803526 | B1 | 11/2017 | |
| KR | 20190100064 | A | 8/2019 | |
| KR | 20210058155 | A | 5/2021 | |
| KR | 20210124466 | A | 10/2021 | |
| KR | 102360019 | B1 | 2/2022 | |
| KR | 20220039588 | A | 3/2022 | |
| WO | 2020172427 | A1 | 8/2020 | |
| WO | 2021111409 | A3 | 6/2021 | |
| WO | 2021210805 | A1 | 10/2021 | |
| WO | 2021221339 | A1 | 11/2021 | |
| WO | 2021221415 | A1 | 11/2021 | |
| WO | 202260002 | A1 | 3/2022 | |

OTHER PUBLICATIONS

CN210460079U, Meng et al., "Energy storage container", machine English translation retrieved from https://worldwide.espacenet.com/ Date: Sep. 19, 2023 (Year: 2020).*
KR200474982Y1, Jangwoong, et al. "Opening and Closing Type Vent Cover", machine English translation retrieved from https://worldwide.espacenet.com/ Date: Mar. 4, 2024 (Year: 2014).*
HVAC Premium, "How Air Conditioning Grilles & Vents Affect Home Temperature", Nov. 26, 2020 (Year: 2020).*
"Protecting Battery Energy Storage Systems from Fire and Explosion Hazards", Power Magazine, Jul. 1, 2021 (Year: 2021).*
PNNL Intellivent PNNL-SA-157950 Brochure (Feb. 2021).

* cited by examiner

ENERGY STORAGE UNIT WITH ACTIVE VENTILATION SYSTEM AND ASSOCIATED METHOD

CROSS-REFERENCE TO RELATED APPLICATION

This application is based upon and claims the benefit of priority from the prior Canadian Patent Application No. 3140540, filed on Nov. 26, 2021, the entire contents of which are incorporated herein by reference.

TECHNICAL FIELD

The technical field of the invention relates to energy storage units with battery modules, and in particular, to the control of thermal runaway in energy storage units with batteries. The invention relates to a system and method for active ventilation in case of thermal runaway.

BACKGROUND

Although electrical battery technologies are generally safe, including for example the lithium iron phosphate (LFP) cell technology which is considered among the safest in the lithium ion battery family, fire prevention standards impose minimum requirements to mitigate the risks associated with thermal runaway. In exceptional cases, battery energy storage devices may become dysfunctional, which can lead to thermal runaway, creating localized areas of very high temperature.

Such high temperatures may cause some materials to begin to decompose and generate gases. The gases generated during such events may be flammable.

When the storage units comprise a plurality of cells, this can result in a chain reaction in which the storage devices enter a series of cascading thermal runaways, as heat emitted from one cell spreads to the next cell, which in turn can thermally runaway.

There is a need to control thermal runaway phenomenon in energy storage units.

SUMMARY

According to a first aspect, an energy storage unit capable of controlling a thermal runaway is described. The energy storage unit includes: an enclosure for housing battery modules for energy storage, the enclosure comprising lateral sides, a top side and a bottom side; at least one movable panel provided on the top side of the enclosure, the at least one movable panel being configurable between a closed position for closing the enclosure during a normal mode of operation of the energy storage unit, and an open position for allowing heat and explosive gases in the enclosure to escape to the outside of the enclosure, in a thermal runaway control mode; at least one controllable actuator, connected to the at least one movable panel, for moving the movable panel from the closed position to the open position, at least one sensor capable of measuring environmental parameters of the interior of the enclosure, and a control unit connected to the at least one sensor and the at least one controllable actuator, the control unit automatically activating the at least one controllable actuator to move the panel(s) from the closed position to the open position when at least one of the measured environmental parameters is indicative of the thermal runaway, to allow heat and explosive gases generated by the thermal runaway to escape outside the enclosure.

According to one possible embodiment, said at least one sensor is adapted to measure environmental parameters including at least one of: a temperature inside the enclosure, a temperature of the battery modules, a hydrogen rate, a carbon monoxide rate, a carbon dioxide rate, a gas rate, a smoke rate and an electrolyte vapor rate.

According to one possible embodiment, the at least one controllable actuator comprises a lock and an extension connector.

According to one embodiment, the lock comprises a magnetic lock or a solenoidal lock.

According to one possible embodiment, the extension connector is selected from the group comprising: a spring, an electric cylinder, a pneumatic cylinder and a mechanical cylinder.

According to one possible embodiment, the energy storage unit further comprises a heating, ventilation and air conditioning (HVAC) module, the control unit activating the HVAC module to draw outside air into the enclosure when at least one of the measured parameters is indicative of thermal runaway.

According to one possible embodiment, when the at least one movable panel is moved from the closed to the open position, explosive gases are directed toward top corners of the enclosure.

In one embodiment, the enclosure includes a protective cover with venting openings, the protective cover being located above the at least one movable panel, allowing the energy storage unit to be protected from the weather while allowing the movable panel to be opened and gases to escape in the event of thermal runaway.

According to one possible embodiment, the at least one movable panel comprises two panels, each being hingedly connected to a support structure of the enclosure, and opening towards the lateral sides of the enclosure.

According to a second aspect, a method for controlling a thermal runaway in an energy storage unit comprising battery modules is described. The method comprises: measuring, by at least one sensor, environmental parameters located inside the energy storage unit; detecting a thermal runaway when at least one of the measured parameters or when the rate of change of at least one of the measured parameters is outside a predetermined range of values, associated with the at least one parameter; and automatically activating at least one actuator to move at least one movable panel provided on a top side of the energy storage unit from a closed position, corresponding to a normal mode of operation of the energy storage unit, to an open position, corresponding to a thermal runaway control mode, so that heat and explosive gases generated by the thermal runaway can escape outside of the energy storage unit.

According to a possible embodiment, the step of measuring environmental parameters comprises measuring, by means of said at least one sensor, environmental parameters including at least one of: a temperature inside the energy storage unit, a temperature of the battery modules, a hydrogen rate, a carbon monoxide rate, a carbon dioxide rate, a gas rate, a smoke rate and an electrolyte vapor rate.

According to one possible embodiment, the step of determining thermal runaway comprises: comparing respective values of the measured parameters with predetermined value ranges associated with said parameters, and detecting, by a control unit, the thermal runaway.

According to one possible embodiment, the method comprises detecting the thermal runaway when a hydrogen rate is above 50 ppm.

According to a possible embodiment, the method comprises detecting the thermal runaway when a temperature of the battery modules is above 80° Celsius.

According to a possible embodiment, the step of automatically activating at least one actuator comprises a step of unlocking a lock, causing a sudden extension of at least one extension connector connected to the at least one movable panel and then opening of the movable panel, the explosive gases escaping towards top corner of the energy storage unit.

According to one possible embodiment, unlocking a lock comprises de-energizing a magnetic lock or energizing a solenoid lock.

According to one possible embodiment, the method includes a step of activating an HVAC module in a mode where outside air is drawn into the energy storage unit, forcing explosive gases to be vented from the energy storage unit.

According to a possible embodiment, the step of automatically activating at least one actuator comprises actuating a first movable panel via a first actuator and a second movable panel via a second actuator, the first and second actuators being controllable by the control unit, to open the first and second panels toward the top side of the unit.

According to a possible embodiment, the method comprises stopping operation of the battery modules when a thermal runaway is detected.

According to a possible embodiment, the method includes sending an alert to a first responder center when thermal runaway is detected.

According to a possible embodiment, the method further comprises emitting an audible and/or visual indicator when thermal runaway is detected.

According to a possible embodiment, the method includes activating fans associated with the battery modules when thermal runaway is detected.

Other objects, advantages, aspects and features of the invention will become clearer and better understood in view of the non-limiting description of the invention, and through the figures present in the application.

BRIEF DESCRIPTION OF THE DRAWINGS

A detailed description of possible embodiments of the invention will be given below, with reference to the following drawings.

DETAILED DESCRIPTION

In the following description and figures, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures or described in the present description are only indicative, and show possible embodiments, presented as examples, and should not be construed as limitations of the invention.

In general, the present application relates to an energy storage unit adapted to detect and control a thermal runaway phenomenon. An energy storage unit may also be referred to as an energy storage system. In the embodiment shown in FIGS. 1 to 9, the energy storage unit comprises two enclosures for housing a plurality of battery modules. Each enclosure is provided with a movable panel located on a top side of the enclosure, where the movable panel can comprise one or more movable parts. The movable panel is configurable between a closed position and an open position. In possible embodiments, the energy storage units can have a size similar to that of shipping containers. In possible embodiments, the top side of the enclosure comprises one or more movable panel(s), that closes the enclosure during normal operating conditions, but that can open and expose the top section of the enclosure in case of thermal runaway. The advantage of locating the movable panels on the top portion of the enclosure is that explosive gases will have a natural tendency to move up, so opening to top of the enclosure will more efficiently evacuate the gases. Another advantage is related to security :by opening the panels on top of the unit when a thermal runaway occurs, the risk of explosive gases reaching maintenance personnel or operators is mitigated, since the gases will escape the unit at a height greater than that of a human.

Figure 1:
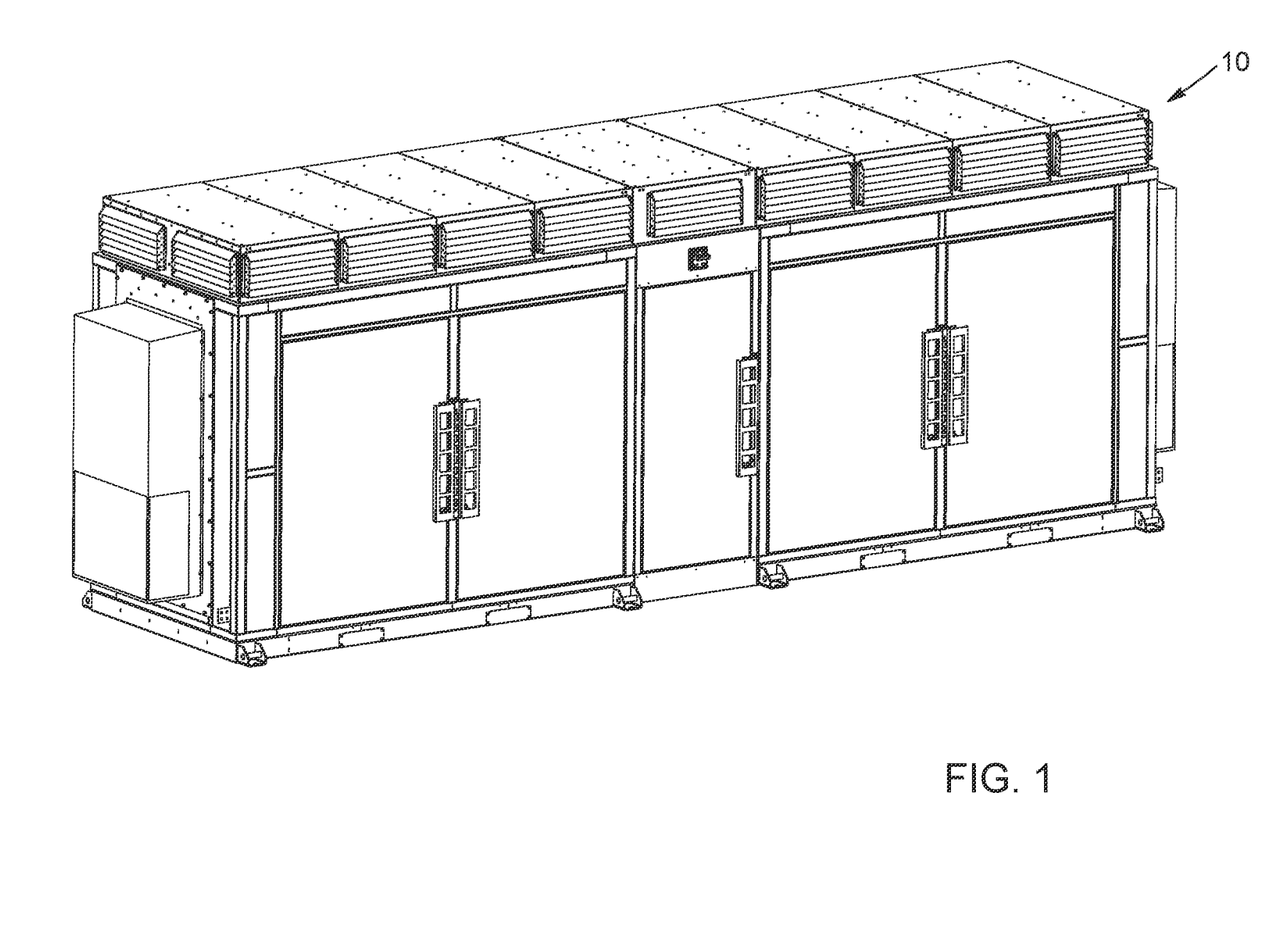
FIG. 1 is a perspective view of an energy storage system, comprising two enclosures and a control unit, according to one embodiment.
Figure 2:
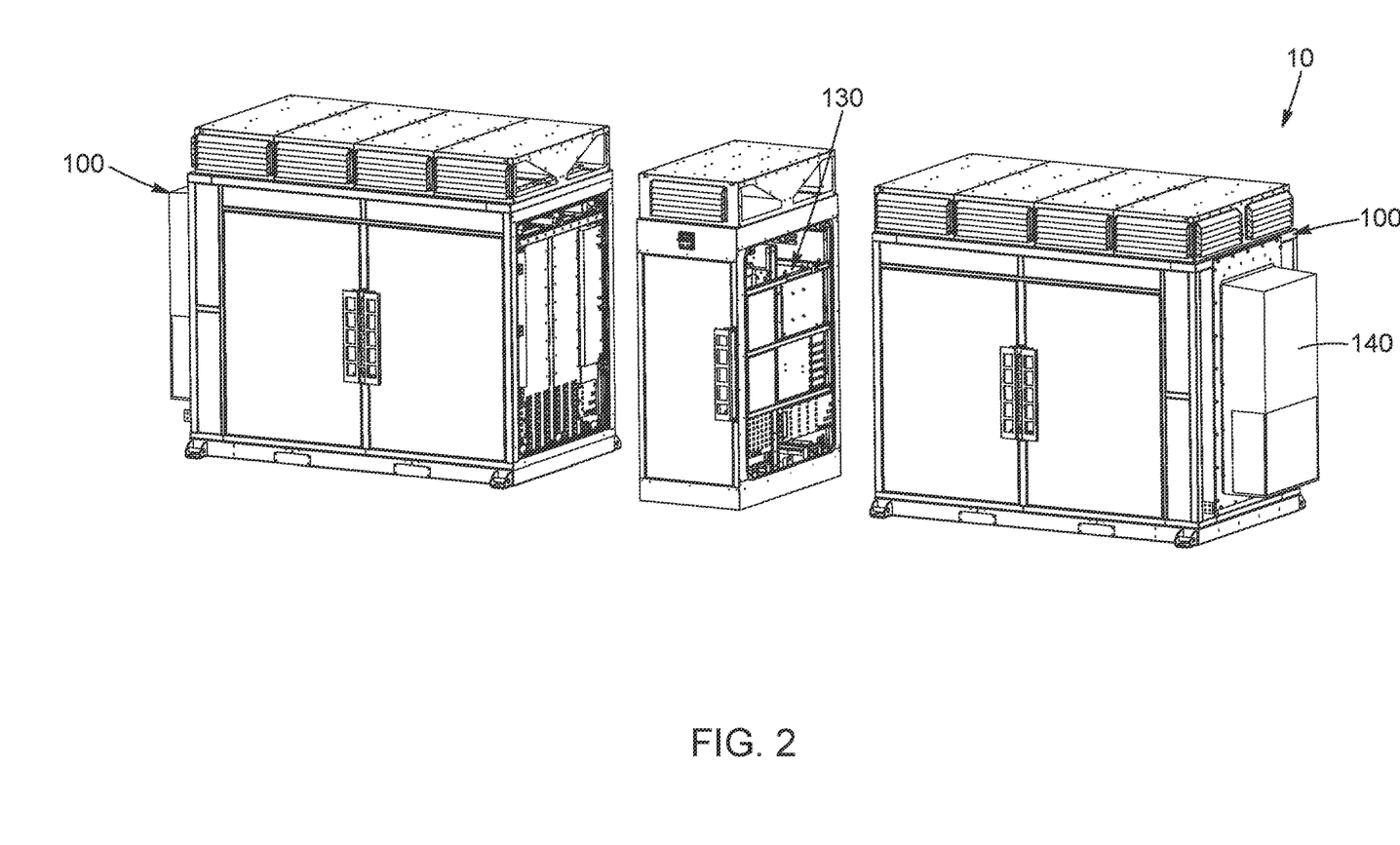
FIG. 2 is a semi-exposed perspective view of FIG. 1.

Referring to FIGS. 1 and 2, an energy storage unit 10 is shown comprising two enclosures 100 for housing battery modules 122 (identified in FIG. 3) for energy storage, connected on either side of a control unit 130. In normal operation, each enclosure is closed to protect the battery modules. An enclosure has lateral sides, typically four lateral sides, a top side, and a bottom side, facing the ground or other supporting structure. Each enclosure 100 can have a heating, ventilation and air conditioning (HVAC) module 140 connected to a lateral side of the enclosure, opposite the control unit 130 and in fluid communication with the interior of the enclosure 100, i.e., air can flow into or out of the enclosure, depending on the mode of operation of the HVAC. The HVAC 140 has a compressor and fans, and provides adequate control over the volume and temperature of the air flowing into the enclosure. In the normal operating mode, the HVAC 140 maintains the temperature inside the enclosure 100 at a preset value by cooling the air circulating in a closed circuit between the battery modules, which tends to heat up when in contact with the battery modules. In this mode of operation, no air exchange occurs between the interior of the enclosure and the exterior of the enclosure.

The HVAC 140 also includes a "power saving" mode in which the HVAC draws cold air from outside to inside the enclosure, without having to cool it. This mode of operation, which among other things reduces energy consumption, is generally used when outside temperatures are relatively low. This mode of operation is managed automatically by the HVAC, depending on the external parameters. However, in the case of a thermal runaway phenomenon of the energy storage unit 10, the HVAC 140 can be forced, by the control unit 130, to operate in the power saving mode. The control unit may include one or more processors, storage means (memories), communications and control ports, etc. The control unit may include, for example, a programmable logic controller (PLC), an embedded system or a dedicated server.

Figure 3:
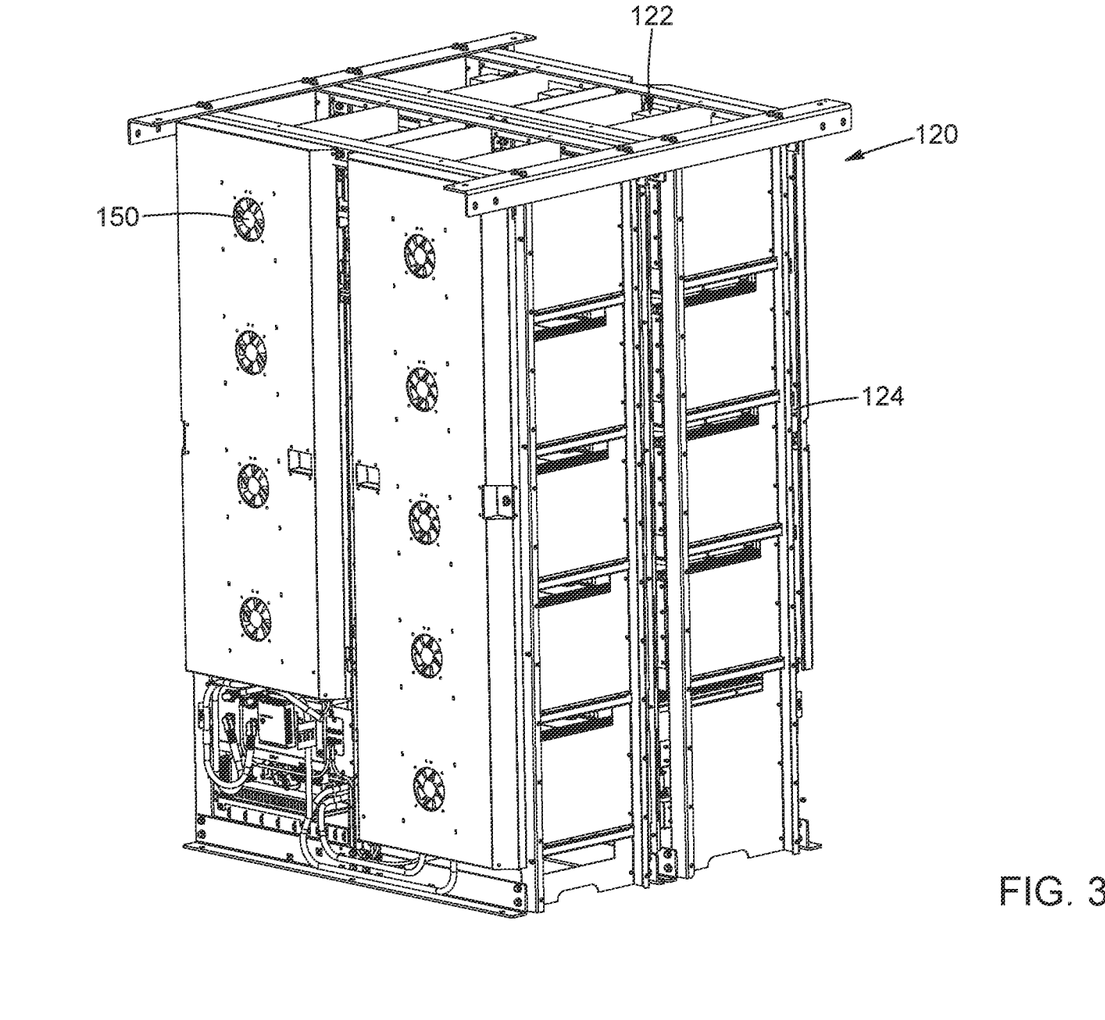
FIG. 3 is a perspective view of a battery cabinet contained within an enclosure, according to one embodiment.
Figure 4:
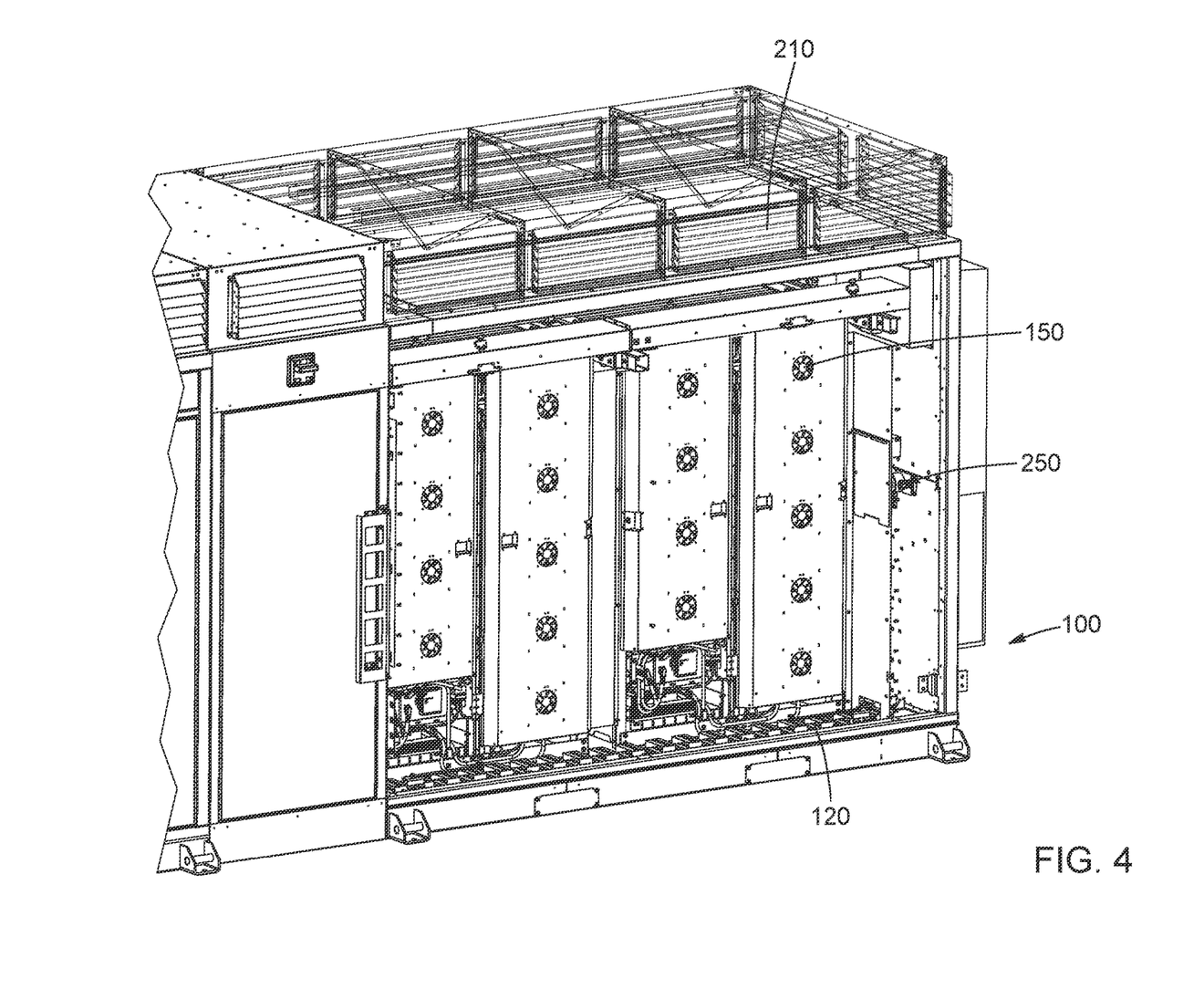
FIG. 4 is a semi-exposed perspective view of an enclosure containing two battery cabinets, according to one embodiment.

Shown in FIGS. 3 and 4 are cabinets 120 that contain multiple battery modules 122. Each enclosure 100 may accommodate one or more cabinets 120. A cabinet 120 may include a metallic support or structure 124 in which a plurality of battery modules 122 are arranged. Each battery module 122 comprises a plurality of cells. These cells may be of different types, such as lithium-ion cells, configured to store electrical energy. Within the metallic structure 124, the modules 122 are spaced apart to create airflow corridors. A fan 150 may be located on the metallic structure 124, substantially at each module. In normal operation, the battery modules are contained within a relatively enclosed enclosure 100. One or more sensors 250 located within the enclosure 100 allow for continuous measurement of environmental parameters of the interior of the enclosure 100.

The battery modules 122 within each cabinet 120 are equipped with sensors that are operatively connected to the control unit 130, so that a battery management system (BMS) located within the cabinet 120 can continuously control and monitor the status of the battery modules, by measuring, among other things:
- a voltage: total voltage or individual cell voltages,
- a temperature: average temperature, inlet or outlet temperature of a coolant if applicable, or temperatures of individual cells,
- a current, input current or output current of the battery module, or
- any other relevant parameter.

The BMS is operationally connected to the control unit 130 which receives the parameters measured by the BMS.

At least one sensor 250 located on an interior surface of the enclosure 100 allows for the measurement of environmental parameters of the interior of the enclosure. In some embodiments, multiple sensors may be located inside the enclosure. These various sensors 250 are capable of measuring multiple environmental parameters, including for example:
- a temperature inside the enclosure,
- a hydrogen rate,
- a carbon monoxide rate,
- a carbon dioxide rate,
- a gas rate,
- a smoke rate,
- an electrolyte vapor rate.

These sensors 250 are also operatively connected to the control unit 130. Measurement or detection of other parameters indicative of thermal runaway may be considered.

Figure 5:
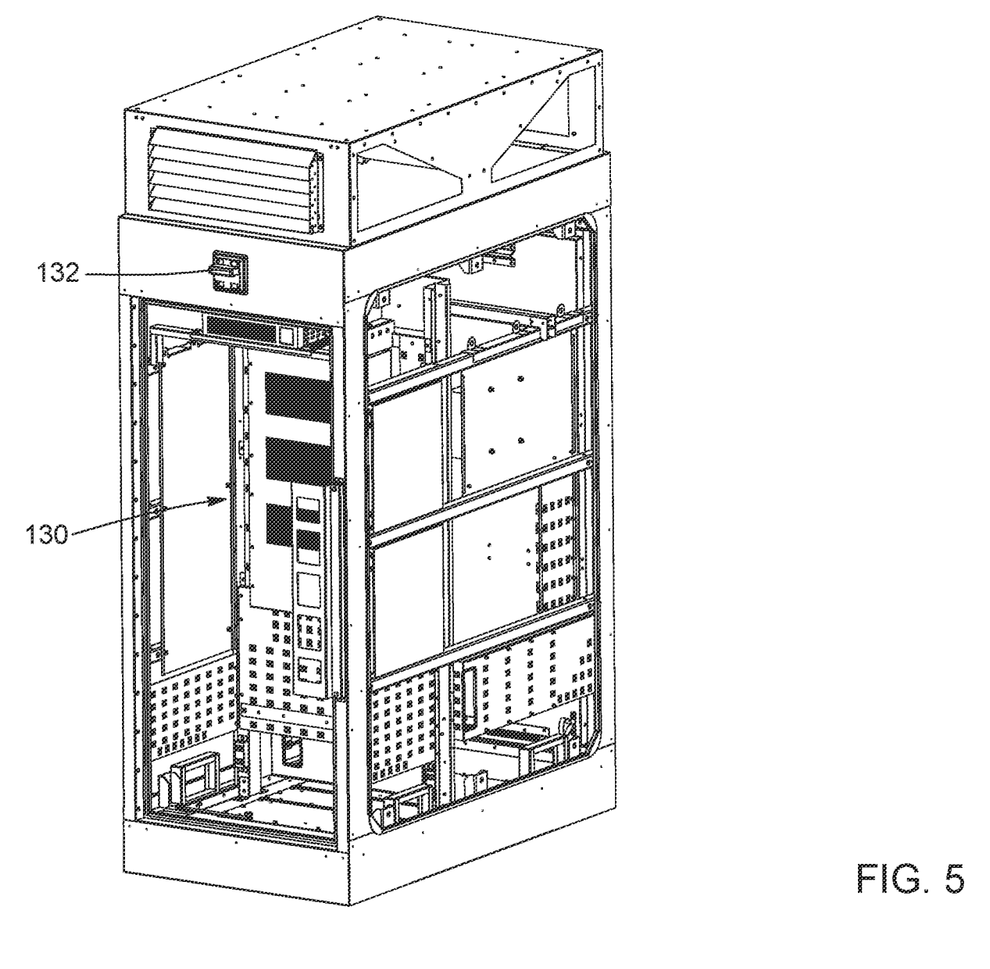
FIG. 5 is a semi-exploded perspective view of a control unit, according to one embodiment.

FIG. 5 depicts the control unit 130, according to one possible embodiment. In the present case, the control unit 130 is a control, power and communication system. Equipped with at least one processor, the control unit 130 manages the operation of the energy storage unit 10. In addition to the battery management system (BMS), which allows for monitoring the status of the batteries, the control unit also houses, in some embodiments, a communication module, allowing for remote supervision, visualization, and control of the various operations of the energy storage unit 10. The control unit 130 may also be equipped with an audible and/or visual indicator 132, allowing for quick and effective communication to operators who may be in the physical vicinity of the energy storage unit 10, in the event of a technical problem such as thermal runaway. The audible indicator can be, for example, a horn, an alarm or a siren, and the visual indicator can be, for example, a strobe or a flashing light.

The control unit 130 thus receives signals or measured values from the sensor 250 as well as from the battery sensors, and analyzes, either periodically or continuously, the measured values of the various parameters. When the measured value of at least one of the parameters is identified as being outside a range of determined values, or when the rate of change of at least one of the measured values is greater than a determined value, then a thermal runaway phenomenon is presumed to be ongoing. Different criteria can be considered to determine a thermal runaway situation or phenomenon, based on the signals and/or values measured from the sensors.

For example, the control unit can be configured to determine that a thermal runaway phenomenon is ongoing if the temperature of the battery modules exceeds 80° Celsius, if the hydrogen rate in the enclosure is greater than 50 ppm, or if the presence of smoke is detected. The examples given are only indicative: the values determined to detect a thermal runaway phenomenon may be different, and the parameters may be different.

Figure 6:
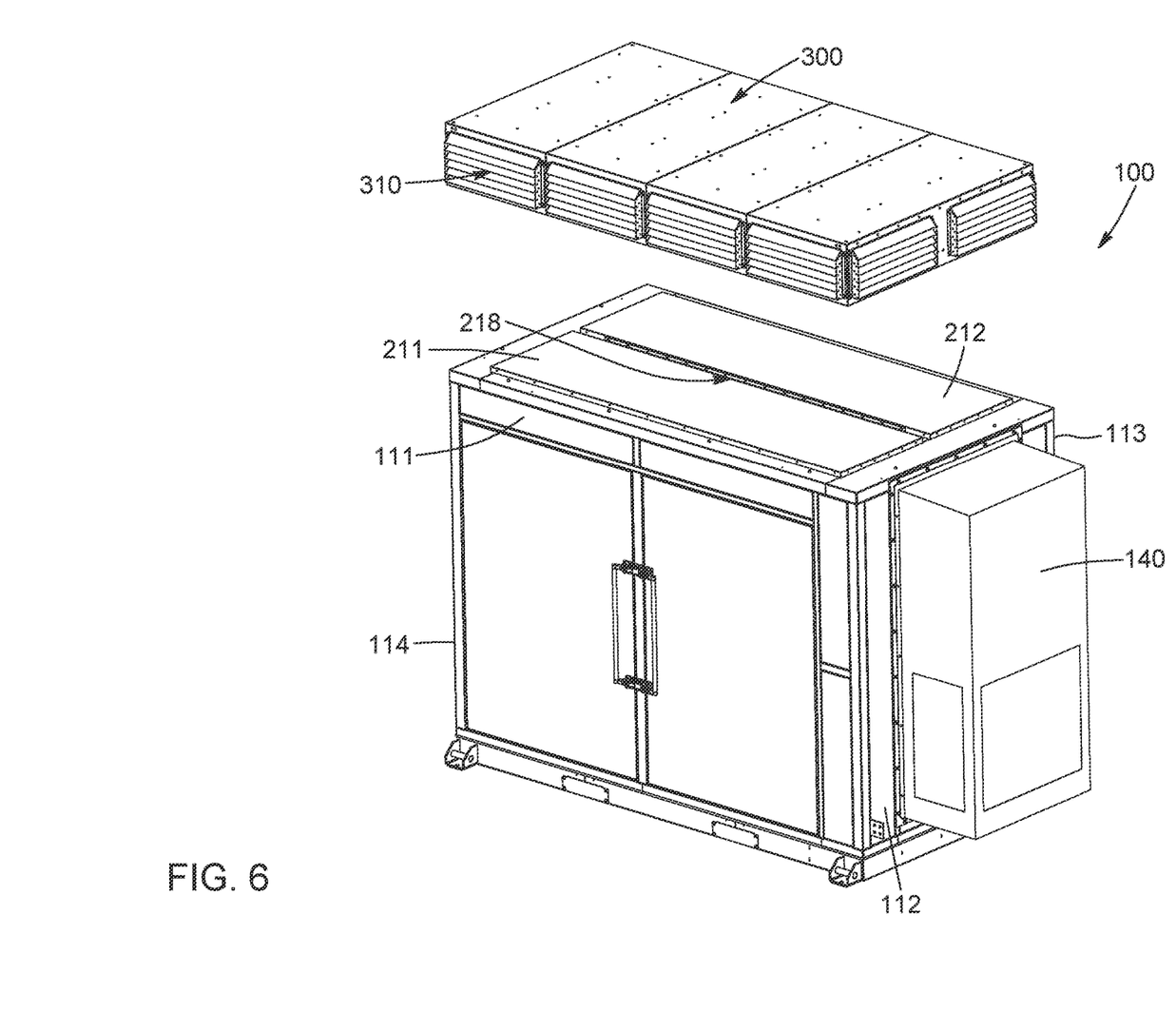
FIG. 6 is a semi-exploded perspective view of an enclosure in normal operation, according to one embodiment.
Figure 7:
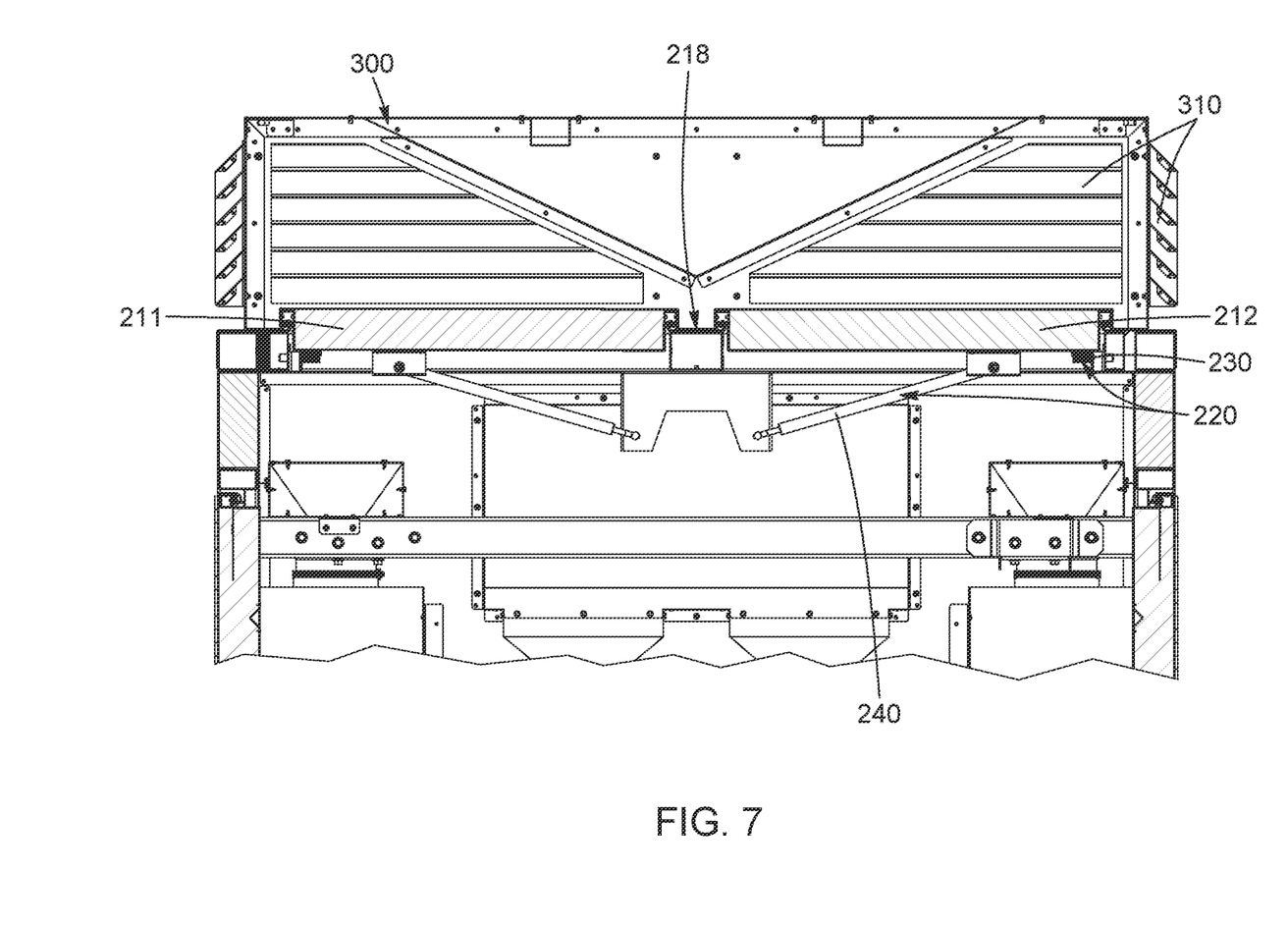
FIG. 7 is a cross section of an enclosure in normal operation, according to one embodiment.

FIGS. 6 and 7 depict an enclosure 100 of the energy storage unit 10, in its so-called normal mode of operation. The enclosure 100 includes four lateral sides 111, 112, 113 and 114, a top side 110 and a bottom side (not shown). In some embodiments, the lateral sides 111 and 113 are equipped with doors providing access to the cabinets that house the battery modules. An HVAC 140 is connected to the enclosure on another of the lateral sides 112. The lateral side 114 is connected to the control unit 130. In the embodiment shown, the top side 110 includes two movable panels 211 and 212, but it will be understood that a single movable panel could be used, or that more than two panels could also be used. These two movable panels 211 and 212 are hinged about their respective hinges 218, in this case attached to a support structure of the enclosure, such as a transverse post. The movable panels are each configurable between a closed position and an open position using a controllable actuator 220. FIGS. 6 and 7 depict the two movable panels 211 and 212 in the closed position.

According to one embodiment shown, the controllable actuator 220 includes a lock 230 and an extension means 240. The lock 230 is used to hold the movable panels 211 and 212 in a closed position. The lock 230 may be a magnetic lock or a solenoidal lock, or any other type of electrically or electronically controllable lock. A magnetic lock consists of two metal parts in contact with each other. These metal parts become magnetized when an electric current passes through them, securing the lock in the closed (locked) position. To unlock the magnetic lock, simply turn off the power to the lock. The magnetic lock therefore has the advantage of switching to unlocked mode automatically when a prolonged power failure occurs. However, a solenoid lock can also be used in some embodiments. A solenoid lock uses an electrical current to contract the solenoid contained within the lock and thus unlock the lock. This solenoid lock therefore requires a current source to be deactivated. In some embodiments, other types of locks, controllable by an electrical or electronic signal from the control unit 130, may be used.

The extension connector 240 allows the movable panels 211 and 212 to move from the closed position to the open position. The extension connector 240 may be a spring (metal or air), an electric cylinder, a pneumatic cylinder, a mechanical cylinder, or any other passive or electrically/electronically controllable means that allows the movable panels 211 and 212 to be moved to the open position. For example, in one embodiment, the movable panels 211 and 212 could be deployed to the open position by the action of a torque located at the hinge 218, or by a pulley and counterweight system engaged when the lock 230 is opened.

Since the energy storage unit 10 is intended to be used outdoors, a protective cover 300 may also be used. This protective cover 300 protects the energy storage unit from bad weather such as rain, snow, ice or hail, and is positioned on the top side 110 of the enclosure 100, above the movable panel. Slightly raised with respect to the top side 110 of the enclosure, the cover has a top panel that is spaced away from the movable panel, such as to provide sufficient clearance to allow the opening of the movable panels 211 and 212. The four lateral sides of the protective cover 300 are provided with ventilation openings 310, formed by louvers or a grid, as examples only. In the illustrated example, these ventilation openings 310 comprise longditunal openings provided between louvers, that allow a circulation of fluids from the inside of the enclosure 100 to the outside, and thus allow the escape of gases in case of thermal runaway, while preventing rain or snow from entering in an inner space formed by the cover and the top side of the enclosure. The protective cover, placed above the enclosure and the movable panel(s), protects the panel(s) from snow, ice or rain accumulations, which could otherwise prevent the panels from opening.

Figure 8:
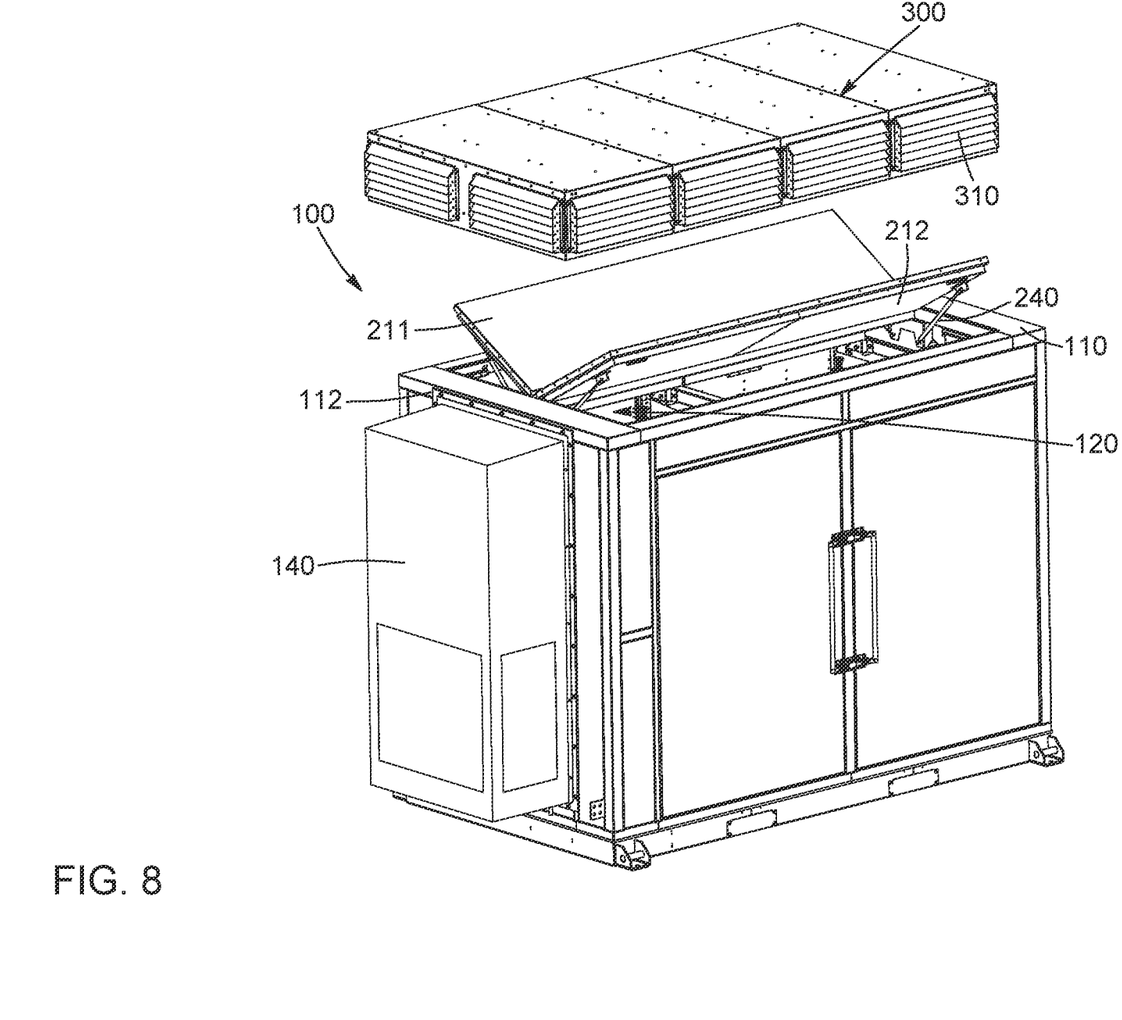
FIG. 8 is a semi-exploded perspective view of an enclosure in thermal runaway control mode, according to one embodiment.
Figure 9:
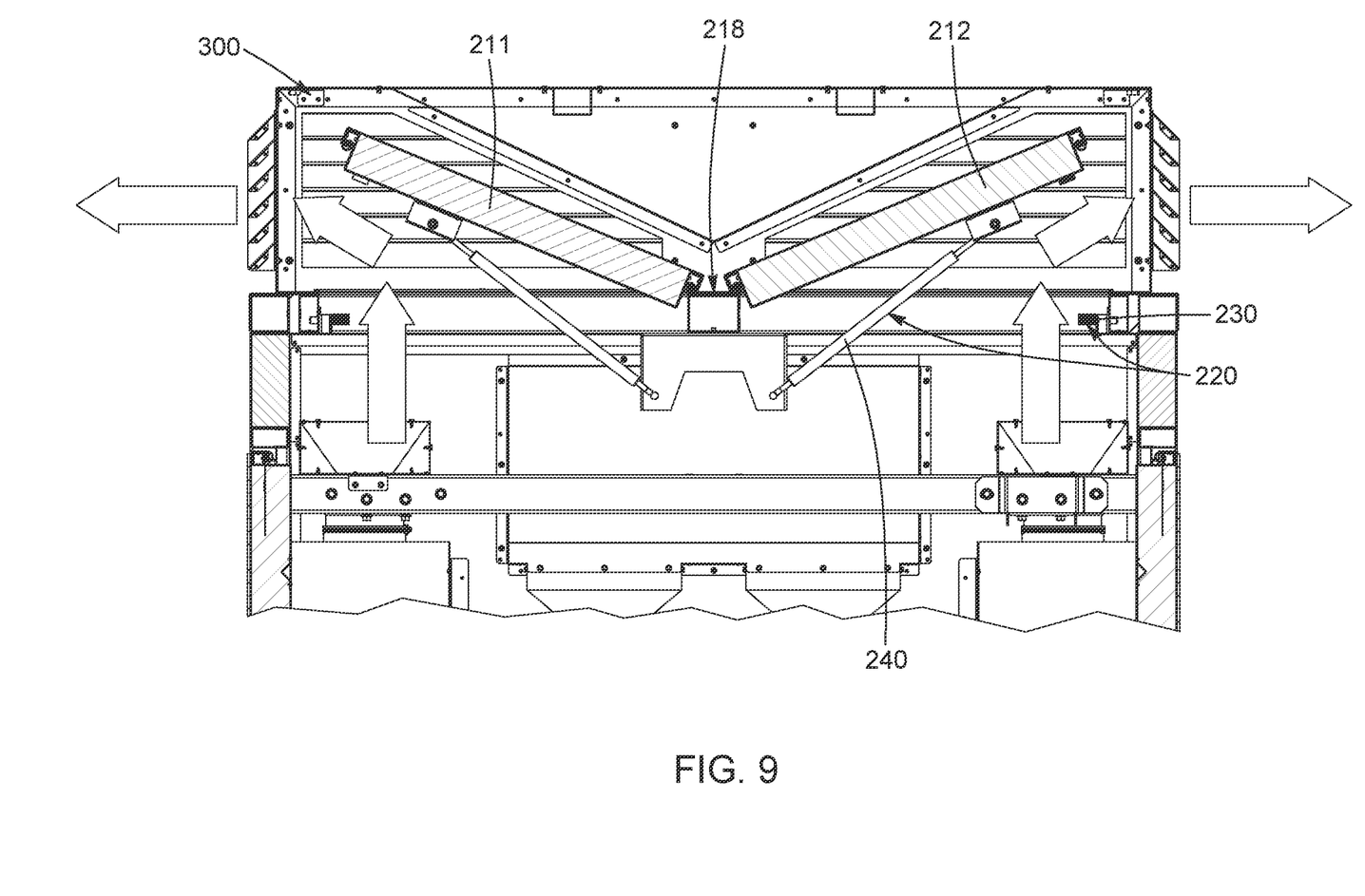
FIG. 9 is a cross-section of an enclosure in thermal runaway control mode, according to one embodiment.

FIGS. 8 and 9 depict an enclosure 100 of the energy storage unit 10, in thermal runaway control mode. In the event that the control unit 130 detects a thermal runaway event, the control unit 130 transmits the command to deactivate the lock 230, which activates the extension connector 240, so that the two movable panels 211 and 212 move from the closed position to the open position. In the illustrated example, the panels open at approximately 25° from the horizontal in a rotation about the axis of the hinge 218. In this configuration, gases contained within the enclosure can easily escape to the outside, through the opening created by the movable panels 211 and 212, and then through the ventilation means 310 of the protective cover 300. The panels can be opened with a different opening, as long as the gases released by the thermal phenomenon can escape from the enclosure. In this embodiment, each panel is hingedly connected to a support structure of the enclosure, and open towards the lateral sides of the enclosure. Explosive gases generated by the thermal runaway can be directed toward top corners of the enclosure, such that they can escape the unit away from any operator that may be present in the surroundings of the unit when the thermal runaway occurs.

It is understood that the embodiments described in connection with FIGS. 1-9 are only a possible embodiment, among others. For example, the movable panel could be located on a lateral side of the enclosure. However, such configuration may be difficult to operate in case of snow or ice accumulation on the floor, preventing the opening of the movable panels. In another example, an energy storage unit could include a different number of battery module enclosures. The control unit could be arranged differently, and include different sub-modules. Depending on the geographic location where the battery storage unit is located, the HVAC module could be optional. According to one embodiment, the HVAC module may be replaced or supplemented with a system having fans. A different number of movable panels may be considered, as well as other types of controllable actuators, to open the panels in case of thermal runaway detection.

Figure 10:
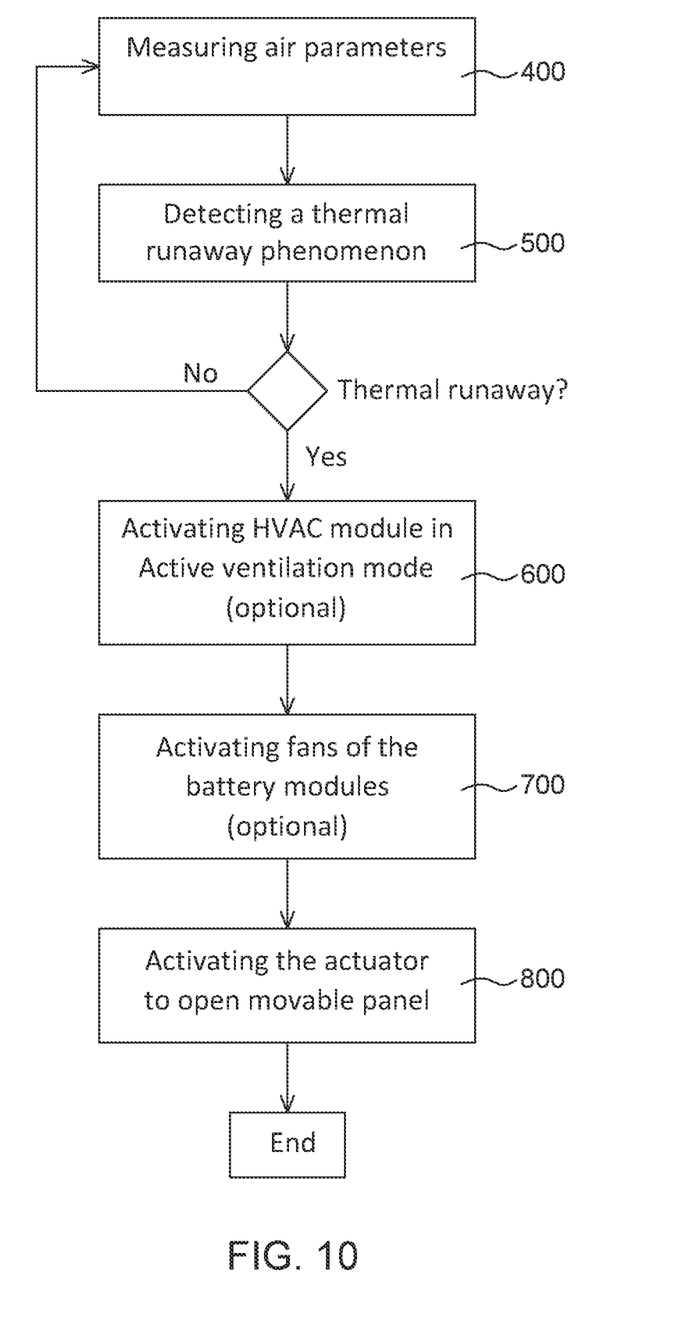
FIG. 10 shows a high-level block diagram of a thermal runaway control method, according to one embodiment.
Figure 11:
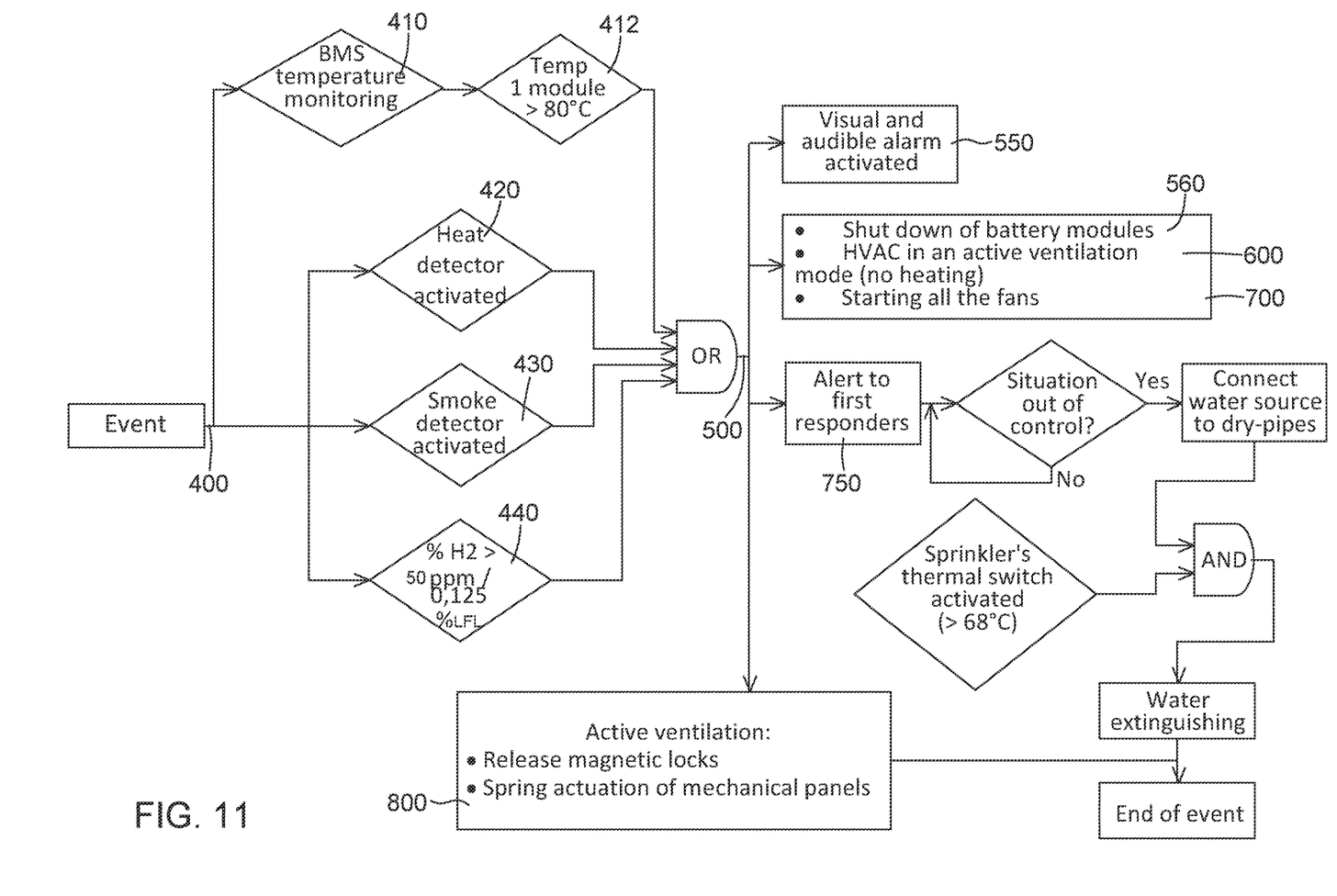
FIG. 11 shows a detailed diagram of FIG. 10.

FIGS. 10 and 11 show functional diagrams comprising steps for performing control of a thermal runaway phenomenon detected within an energy storage unit, according to one possible embodiment. The first step 400 involves measuring, preferably continuously, with at least one sensor, one or more environmental parameters of the energy storage unit 10. This sensor, as well as the battery management system (BMS), transmit various environmental and operating parameters of the energy storage unit 10, including for example one or more of the parameters listed above, such as temperature; gas concentration or variation; and the presence of smoke.

These parameters are transmitted to the control unit 130 which analyzes these parameters and compares them to a range of values. When the measured value of at least one of the parameters is identified as being outside a range of determined values, or when the rate of change of at least one of the measured values is greater than a determined value, then a thermal runaway phenomenon is detected 500. It is also possible that the comparison of the measured values is carried out at the sensors themselves, and that the information transmitted from the sensor(s) to the control unit includes an indication of the presence of thermal runaway.

With reference to FIG. 11, examples of measured parameters include the temperature of the battery modules 410, the temperature inside the enclosure 420, the presence of smoke 430, or the hydrogen rate in the enclosure 440. The measured values are transmitted to the control unit 130, which receives the parameters, analyzes the parameters, and compares the parameters to predetermined value ranges. The ranges of values for identifying a thermal runaway phenomenon can also be adjusted depending on the configuration of the unit and the type of batteries. For example, the acceptable hydrogen rate in the enclosure can be determined based on the lower flammability limit (LFL) of hydrogen. If the concentration of hydrogen exceeds the LFL, it can ignite with air at normal temperature and pressure. Below the LFL, the hydrogen/air mixture will not ignite. The LFL is normally expressed as a percentage by volume in air. In one possible embodiment, the hydrogen concentration in the enclosure should not exceed 25% of the LFL. Since the LFL of hydrogen is commonly 4% (% by volume), the detection threshold for a thermal runaway phenomenon could be set at 1% by volume of hydrogen (25% of 4%). The detection threshold can also be expressed in parts per million (ppm). In this case, the hydrogen threshold for detection of a thermal runaway phenomenon could be set at 50 ppm, or 100 ppm 440, which are values significantly lower than the 25% LFL threshold. In one embodiment, other gas rates could be measured and used to detect a thermal runaway phenomenon. Gas rates that could also be measured include, but are not limited to, gases such as LiF (lithium fluoride), $POF_3$ (phosphoryl fluoride), $PF_5$ (phosphoryl pentafluoride) HF (hydrogen fluoride), $H_2O$ (water vapor), or other electrolyte gases that may be released into the enclosure 100 in the event of a thermal runaway. These examples are for illustrative purposes only, and other limits may be set.

The temperature of the battery modules, transmitted by the BMS, can also be used to detect a thermal runaway phenomenon. Indeed, if a cell is in thermal runaway phenomenon, there is a risk that this cell will drag the adjacent cells, thus creating a series of thermal runaways in cascade. In one embodiment, measures to limit the thermal runaway phenomenon could be triggered if the temperature of at least one of the battery modules exceeds 80° Celsius 412. Other temperature thresholds may be set depending on the configuration of the battery modules in the energy storage unit enclosure.

In one embodiment, the total module voltage or the individual battery cell voltage could also be used to detect a thermal runaway phenomenon. Indeed, a too high or too low voltage could be indicative of a thermal runaway phenomenon.

When a thermal runaway phenomenon 500 is detected by the control unit 130, a series of steps may then occur, more or less in parallel. The steps 550, 560, 600, 700, 750 and 800 as shown in FIG. 11 are described below in a certain order. It is important to note that this order is flexible and that steps 550, 560, 600, 700, 750 and 800 can be performed in a different order or simultaneously.

Step 550 involves generating a visual and/or audible alarm. The thermal runaway phenomenon information is transmitted by the control unit 130 to the audible and/or visual indicator 132 located on a visible face of the control unit. This visual (flashing light) and/or audible (siren) alarm is used to inform people who may be physically close to the energy storage unit 10 that an exceptional situation has occurred and that the area surrounding the energy storage unit 10 is potentially dangerous.

Step 560 includes shutting down the activity of the energy storage unit 10. In some embodiments, the battery cabinets may include an internal switch (such as a relay or other controllable shutdown device). This internal switch is controlled by the BMS contained in the control unit 130. In the event of a thermal runaway event, the battery modules are disconnected by this internal switch, thereby preventing their operation.

Step 600 involves forcing the HVAC 140 into a power saving mode. Regardless of the outside temperature conditions, the control unit 130 can be configured to force the HVAC 140 to operate in a power saving mode, in the event of a thermal runaway phenomenon. In this way, the HVAC operates as a blower that draws in outside air to propel it inside the enclosure 100, allowing the concentration of explosive gases inside the enclosure to be diluted and/or explosive gases to be vented from the energy storage unit. This step is optional and is not required in embodiments that do not have an HVAC. It is noted that the performance objective of the system can be achieved without HVAC. In such embodiments, hot gases will be naturally expelled by the opened panel located on the top side of the energy storage unit, by their property of being lighter than air and floating upward.

Step 700 involves starting all of the fans 150 in the enclosure 100. The metallic structure 124 located inside the enclosure 100 is equipped with a plurality of fans 150, each fan being able to be associated with at least one module and located in front of the latter. In the event of a thermal runaway phenomenon, at least some, and preferably all, of the fans 150 are activated at maximum power, to promote the circulation of cold air and gases through the enclosure. This step is optional and is not required in embodiments that do not have fans.

Step 750 is to send an alert to a first responder center. In an embodiment where the control unit 130 also hosts a communication module, an alert message may be automatically transmitted via the communication module to first responders. The first responders are in most cases firefighters, but may also be, for example, a police department, gendarmerie, public or private security service, or any other person acting as a first responder. This step 750 may also contain subsequent sub-steps such as connecting a water source to the pipes that flow through the energy storage unit 10. The sprinkler thermal switch would be automatically activated with ambient heat, and the water sprayed by the sprinklers could allow heat to be extracted.

Step 800 is to automatically activate an actuator to move a movable panel from a closed position, corresponding to a normal mode of operation of the energy storage unit, to an open position, corresponding to a thermal runaway control mode, so that heat and explosive gases generated by the thermal runaway can escape to the outside of the energy storage unit. In some embodiments, the movable panel 210 may be located on the top face of the energy storage unit 10. In some embodiments, the movable panel 210 may be a single piece, or may be composed of at least two movable parts. In the case of a plurality of movable parts, each of the movable parts may be equipped with its own lock and extension means. In this case, the plurality of locks and extension means will be activated simultaneously. For clarity, the following text refers to one movable panel, one lock, and one extension means, but it is implied that said one panel may be in two or more parts, with an equivalent number of locks and extension means. This step 800 may also contain two substeps that consist of unlocking the lock 230, and causing an extension of the extension means 240 connected to the movable panel and thus an opening of the movable panel. Depending on the type of lock 230 used, the step of unlocking the lock may include de-energizing a magnetic lock or energizing a solenoid lock. Other types of controllable locks may be used, and will receive the command to unlock from the control unit 130 following the detection of a thermal runaway phenomenon. In such configuration, step 800 and step 500 can be executed consecutively, and no security waiting period is requested between these two steps. Even if some people are still present in the vicinity of the site, the opening of the movable panels on the top side of the energy storage unit prevent injury.

When the situation is back under control, the thermal runaway phenomenon is considered to be over. In this case, and after the requested maintenance performed, an operator may manually reposition the movable panel 210 to a closed position, reactivate the lock 230 to keep it closed, and restart the activity of the energy storage unit 10. In one embodiment, closing the movable panel 210 may be automated.

Although certain advantages have been described, the person skilled in the art may discover other advantages and/or features inherent in the invention that have not been explicitly described. Furthermore, although certain configurations and embodiments have been described herein, it is appreciated that they are by way of example only and should not be taken to limit the scope of the invention.

The invention claimed is:

1. An energy storage unit capable of controlling a thermal runaway, the energy storage unit comprising:
   an enclosure for housing battery modules for energy storage, the enclosure comprising lateral sides, a top side and a bottom side;
   at least one movable panel provided on the top side of the enclosure, the at least one movable panel being configurable between:

a closed position for closing the enclosure during a normal mode of operation of the energy storage unit; and an open position for allowing heat and explosive gases in the enclosure to escape outside of the enclosure in a thermal runaway control mode;

at least one controllable actuator, connected to the at least one movable panel, for moving the at least one movable panel from the closed position to the open position, at least one sensor capable of measuring environmental parameters of an interior of the enclosure;

a control unit connected to the at least one sensor and the at least one controllable actuator, the control unit automatically activating the at least one controllable actuator to move the at least one movable panel from the closed position to the open position when at least one of the measured environmental parameters is indicative of the thermal runaway, to allow heat and explosive gases generated by the thermal runaway to escape outside the enclosure; and a protective cover extending over the enclosure and forming a chamber over the at least one movable panel, the protective cover comprising on lateral sides thereof ventilation openings, the at least one panel, when in the open position, opening in the chamber formed by the protection cover, with an outer edge of at least one movable panel facing the ventilation openings of the protective cover, allowing the energy storage unit to be protected from weather while allowing the movable panel to be opened and gases to escape in event of the thermal runaway.

2. The energy storage unit of claim 1, wherein said at least one sensor is measuring environmental parameters including at least one of: a temperature inside the enclosure, a temperature of the battery modules, a hydrogen rate, a carbon monoxide rate, a carbon dioxide rate, a gas rate, a smoke rate, and an electrolyte vapor rate.

3. The energy storage unit of claim 1, wherein the at least one controllable actuator comprises a lock and an extension connector.

4. The energy storage unit of claim 3, wherein the lock comprises a magnetic lock or a solenoid lock.

5. The energy storage unit of claim 3, wherein the extension connector is selected from the group consisting of: a spring, an electric cylinder, a pneumatic cylinder and a mechanical cylinder.

6. The energy storage unit of claim 1, further comprising a heating, ventilation and air conditioning (HVAC) module, the control unit activating the HVAC module to draw outside air into the enclosure when at least one of the measured parameters is indicative of the thermal runaway.

7. The energy storage unit according to claim 6, wherein when the at least one movable panel is moved from the closed to the open position, explosive gases are directed toward top corners of the enclosure.

8. The energy storage unit according to claim 1, wherein the at least one movable panel comprises two panels, each being hingedly connected to a support structure of the enclosure, and opening on opposite sides of the chamber, towards the lateral sides of the protective cover.

9. The energy storage unit according to claim 1, wherein when in the open position, the at least one movable panel is open at approximately between 25° and 30° from the horizontal.

10. The energy storage unit according to claim 1, further comprising a battery management system (BMS) operatively connected to sensors to continuously control and monitor status of the battery modules, by measuring batteries parameters.

11. The energy storage unit according to claim 10, wherein the batteries parameters comprise a voltage, a temperature, or a current.

12. The energy storage unit according to claim 1, wherein the at least one movable panel covers an entirety of the top side of the enclosure.

13. The energy storage unit of claim 2, wherein the thermal runaway is detected when at least one of the measured environmental parameters is identified as being outside a range of determined values.

14. The energy storage unit according to claim 1, further comprising a plurality of fans, located at each battery modules level.

15. The energy storage unit according to claim 1, the protective cover comprising at least one deflecting plate located at an angle above the at least one movable panel, to deflect explosive gases towards the ventilation openings and to limit opening of the at least one movable panel in the event of violent shock caused by thermal runaway.

16. The energy storage unit according to claim 15, the chamber formed above the enclosure by the protective cover comprises a first section for receiving the at least one movable panel, and a second section, the deflecting plate separating the two sections of the chamber and limiting the volume in the protective cover where explosive gases can be evacuated.

17. The energy storage unit according to claim 15, wherein the at least one deflecting plate extends substantially parallel to the at least one movable panel when in the open position.

18. The energy storage unit according to claim 1, wherein the ventilation openings comprise louvers located on the lateral sides of the protective cover.

19. The energy storage unit according to claim 1, wherein the protective cover comprises several modular sections assembled on top of the enclosure.

20. The energy storage unit according to claim 1, wherein the enclosure comprises one or more openings at the top of the enclosure to allow explosive gases to escape upwards in the event of thermal runaway, the at least one movable panel opening at an angle to the horizontal above the enclosure to force explosive gases towards the lateral sides of the protective cover, through the ventilation openings.

* * * * *